(12) United States Patent
Iqbal

(10) Patent No.: US 10,187,697 B2
(45) Date of Patent: *Jan. 22, 2019

(54) ENABLING COMMUNICATION CONNECTIONS RELATED TO RECEIVED CONTENT

(71) Applicant: EchoStar Technologies L.L.C., Englewood, CO (US)

(72) Inventor: Md. Mashfique Iqbal, Aurora, CO (US)

(73) Assignee: DISH TECHNOLOGIES LLC, Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/750,059

(22) Filed: Jun. 25, 2015

(65) Prior Publication Data

US 2016/0381424 A1     Dec. 29, 2016

Related U.S. Application Data

(63) Continuation of application No. 13/071,340, filed on Mar. 24, 2011, now Pat. No. 9,094,705.

(51) Int. Cl.
*H04N 21/478* (2011.01)
*H04N 21/4147* (2011.01)
(Continued)

(52) U.S. Cl.
CPC ....... *H04N 21/478* (2013.01); *H04N 21/4126* (2013.01); *H04N 21/4147* (2013.01);
(Continued)

(58) Field of Classification Search
CPC ........... H04N 21/4126; H04N 21/4316; H04N 21/478; H04N 21/4722; H04N 5/445;
(Continued)

(56) References Cited

U.S. PATENT DOCUMENTS 5,262,860 A    11/1993  Fitzpatrick et al.
7,058,356 B2    6/2006  Slotznick
(Continued)

*Primary Examiner* — Benjamin R Bruckart
*Assistant Examiner* — Tien M Nguyen
(74) *Attorney, Agent, or Firm* — Lorenz & Kopf LLP

(57) ABSTRACT

A content receiver determines that a communication connection recipient identifier is associated with content received from a content provider. An associated communication device is identified by the content receiver. The content receiver then signals the communication device to initiate a communication connections utilizing the communication identifier. In some implementations, the content receiver may provide a user with a notification and may signal the communication device after receiving a responses to the notification. In one or more implementations, the communication connection recipient identifiers may be telephone numbers, the communication devices may be telecommunication devices, and the communication connections may be telephone connections. The content receiver may determine that a communication connection recipient identifier is associated with content based on analysis of metadata that accompanies or that otherwise corresponds to the received content or by audio and/or image recognition performed on the content.

11 Claims, 7 Drawing Sheets

(51) Int. Cl.
  *H04N 21/482* (2011.01)
  *H04N 21/488* (2011.01)
  *H04N 21/439* (2011.01)
  *H04N 21/435* (2011.01)
  *H04N 21/442* (2011.01)
  *H04N 21/436* (2011.01)
  *H04N 21/41* (2011.01)

(52) U.S. Cl.
  CPC ....... *H04N 21/435* (2013.01); *H04N 21/4394* (2013.01); *H04N 21/43615* (2013.01); *H04N 21/44227* (2013.01); *H04N 21/4821* (2013.01); *H04N 21/4882* (2013.01)

(58) Field of Classification Search
  CPC ........... H04N 21/4821; H04N 21/4147; H04N 21/4882; H04N 21/44227; H04N 21/4394; H04N 21/43615; H04N 21/435
  See application file for complete search history.

(56) References Cited

U.S. PATENT DOCUMENTS

| | | | |
|---|---|---|---|
| 7,856,204 B2 | 12/2010 | Slotznick | |
| 8,131,208 B2 | 3/2012 | Slotznick | |
| 8,856,849 B2* | 10/2014 | LaFreniere | H04N 21/42204 348/552 |
| 2001/0055951 A1* | 12/2001 | Slotznick | H04M 1/215 455/41.3 |
| 2002/0144262 A1* | 10/2002 | Plotnick | G11B 27/005 725/32 |
| 2005/0282582 A1 | 12/2005 | Slotznick | |
| 2010/0205628 A1* | 8/2010 | Davis | H04M 1/72533 725/25 |
| 2012/0246693 A1* | 9/2012 | Iqbal | H04N 21/4126 725/141 |
| 2014/0098292 A1* | 4/2014 | Chiu | H04N 21/422 348/552 |

* cited by examiner

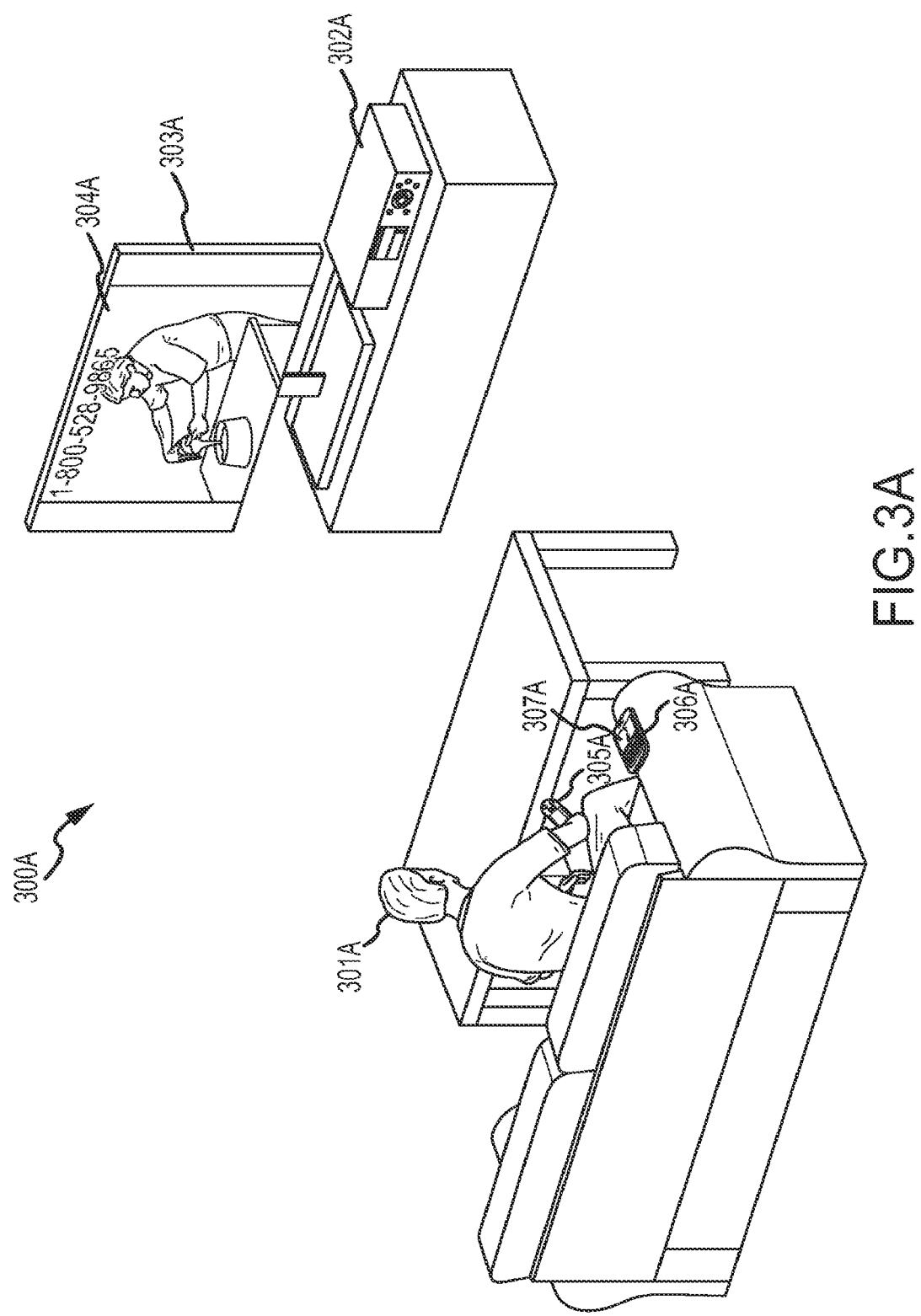

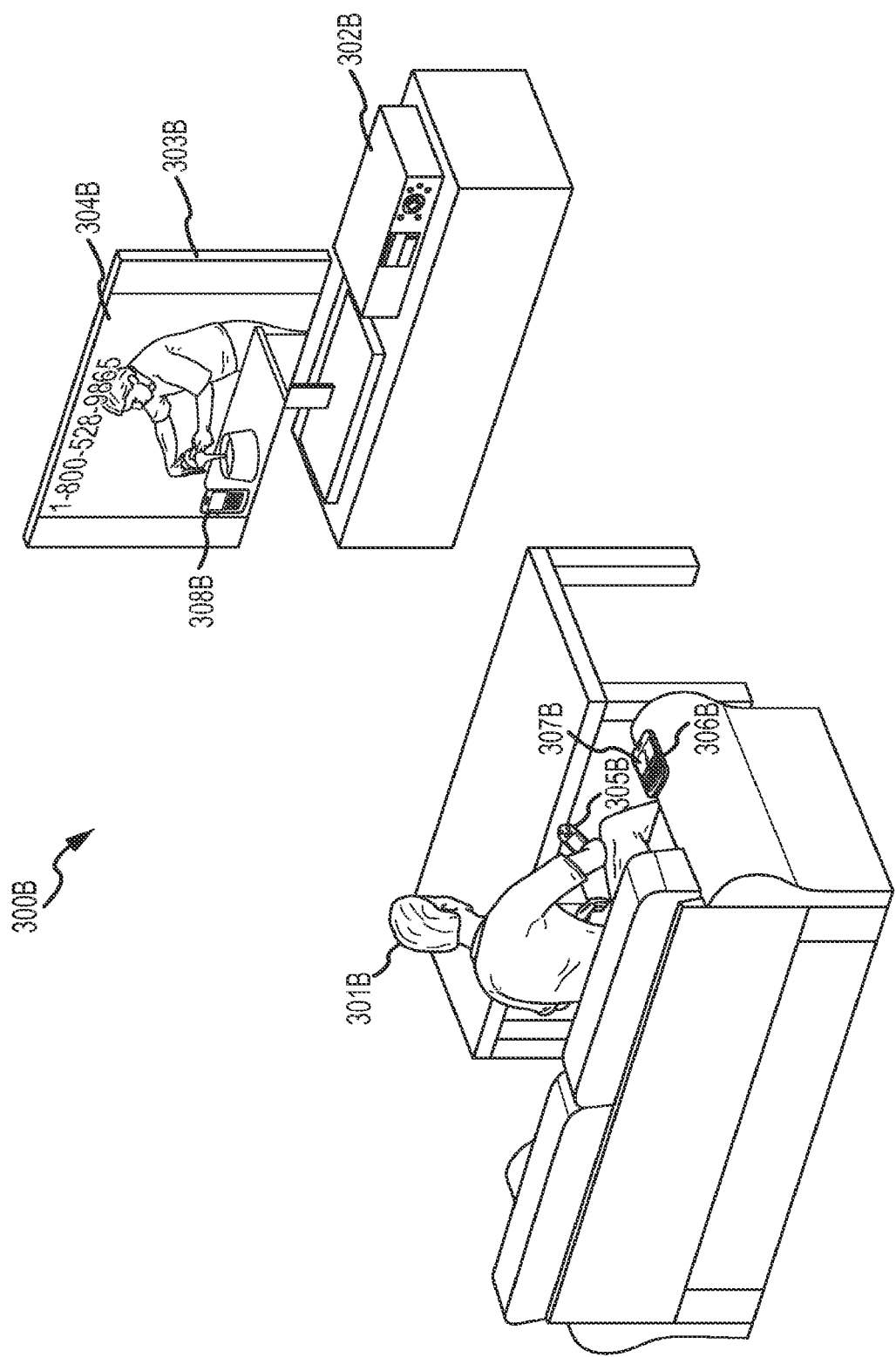

ENABLING COMMUNICATION CONNECTIONS RELATED TO RECEIVED CONTENT

This Application is a Continuation of U.S. patent application Ser. No. 13/071,340, which was filed on 24 Mar. 2011 and which has issued as U.S. Pat. No. 9,094,705 on 28 Jul. 2015, the contents of which are incorporated herein by reference in their entirety.

FIELD OF THE INVENTION

This disclosure relates generally to communication, and more specifically to enabling users to make communication connections that are related to content received and presented by content receivers.

SUMMARY

The present disclosure discloses systems, methods, and computer program products for enabling communication connections related to received content. A content receiver may determine that one or more communication connection recipient identifiers are associated with content that the content receiver has received from one or more content providers. One or more communication devices associated with the content receiver may then be identified by the content receiver. After identifying one or more associated communication devices, the content receiver may then signal the one or more communication devices to initiate one or more communication connections utilizing the one or more communication identifiers. In some implementations, the content receiver may provide one or more users with one or more notifications regarding the communication connection recipient identifier prior to signaling the communication device. In such implementations, the content receiver may signal the communication device after receiving one or more responses from the user indicating to initiate the communication connection.

In one or more implementations, the communication connection recipient identifiers may be telephone numbers. In such implementations, the communication devices may be telecommunication devices and the communication connections may be telephone connections.

In various implementations, the content receiver may determine that a communication connection recipient identifier is associated with content based on analysis of metadata that accompanies the received content or that otherwise corresponds to the received content. In various other implementations, the content receiver may determine that a communication connection recipient identifier is associated with content based on audio and/or image recognition performed on the content in order to identify the one or more communication connection recipient identifiers present in the content.

In some implementations, the content receiver may identify a communication device associated with the content receiver by consulting one or more sets of user preferences that include information regarding associated communication devices. In such implementations the content receiver may be operable to provide one or more user interfaces (which may be provided in response to user input) that may enable users to provide the information regarding associated communication devices. Such information regarding associated communication devices received from users may then be stored by the content receiver.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 3A-3E are diagrams illustrating a user utilizing a system for enabling communication connections related to received content in order to make a telephone call related to a television program the user is watching. In some implementations, the system may be the system of FIG. 1.

DETAILED DESCRIPTION OF THE EMBODIMENTS

Figure 1:
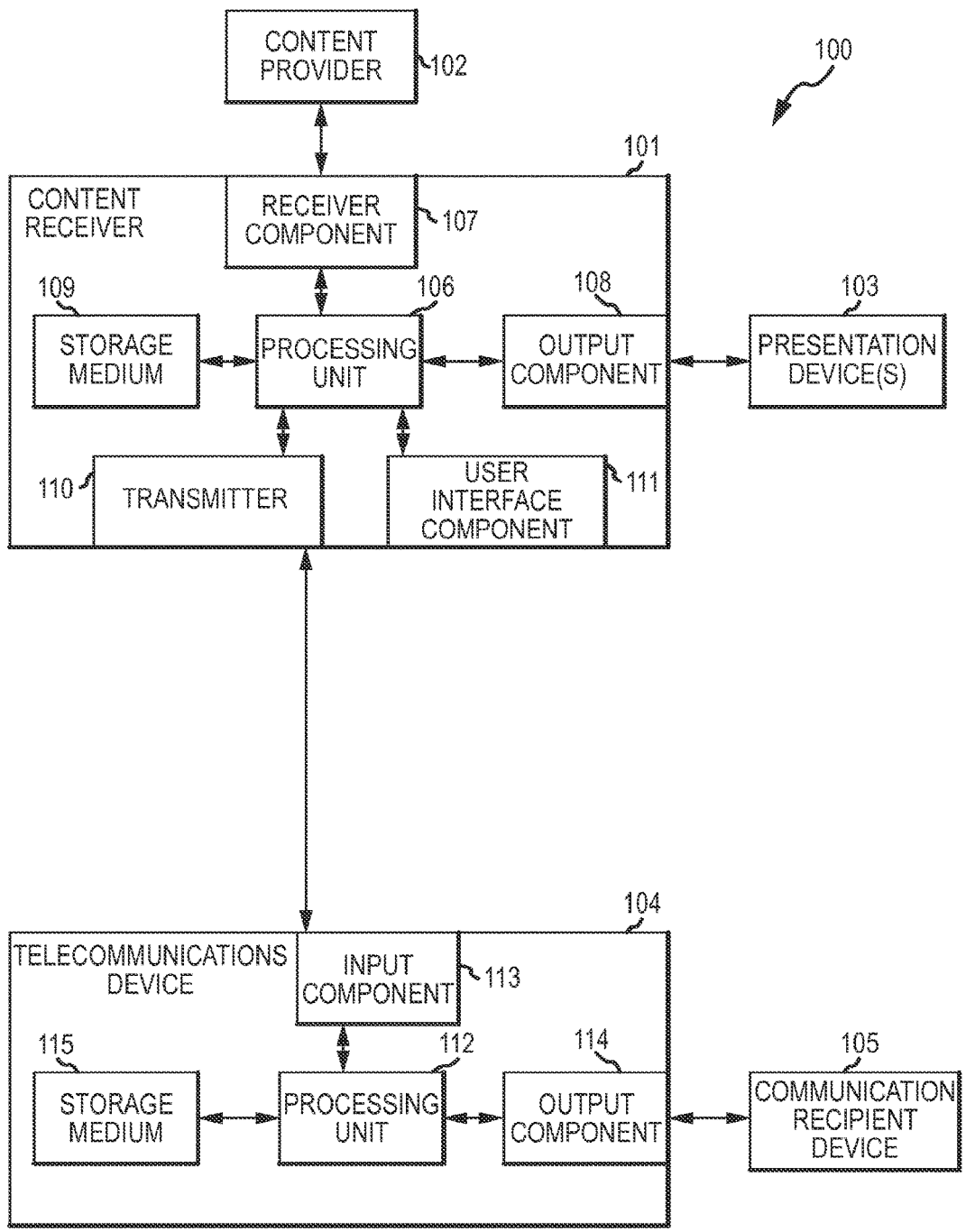
FIG. 1 is a block diagram illustrating a system for enabling communication connections related to received content.

The description that follows includes sample systems, methods, and computer program products that embody various elements of the present disclosure. However, it should be understood that the described disclosure may be practiced in a variety of forms in addition to those described herein.

Content receivers typically receive content (such as video and/or audio content) from one or more content providers via one or more wired communication links, wireless communication links, and/or physical distribution networks and may provide such received content via one or more presentation devices (such as televisions, computer monitors, speakers, and so on). Such content receivers may include, but are not limited to, television receivers, set top boxes, digital video recorders, digital video disc players, radios, digital music players, personal computers, mobile computers, video game systems, and so on. Such content providers may include, but are not limited to, satellite and/or cable television and/or music providers, video on demand providers, pay per view programming providers, digital video disc and/or compact disc retailers, and so on.

In some cases, content received by such content receivers may include information related to one or more communication connections (such as one or more telephone numbers) that may be established which are related to the content. For example, the content may include a commercial advertisement which may present a telephone number that users may be able to dial in order to order products and/or services, obtain information, consult customer support, and/or perform various other activities related to the commercial advertisement. When a user is presented with such a telephone number in a commercial advertisement, the user has the option of accessing a telephone, dialing the provided telephone number, and then engaging in one or more activities that are enabled via the telephone number However, accessing a telephone and dialing one or more telephone numbers provided by such content may be difficult and/or burdensome for users. Users may not be able to access a telephone quickly enough during presentation of telephone numbers. Further, users may not be able to remember the telephone numbers which they wish to dial. Additionally, users may find dialing such numbers to be tedious and may not utilize telephone services which they might otherwise wish to use because they do not want to expend the effort to dial. Moreover, as the users may need the telephone numbers to be visually and/or auditorily presented in order for the users to be able to dial the numbers, visual and/or auditory space in the content may need to be devoted to the telephone numbers so that the telephone numbers may be conveyed to the users. Such visual and/or auditory space, if not utilized to present telephone numbers, might otherwise be allocated to presenting one or more portions of content.

The present disclosure discloses systems, methods, and computer program products for enabling communication connections related to received content. A content receiver determines that one or more communication connection recipient identifiers (such as telephone numbers) are associated with received content. In various implementations, the content receiver may make such a determination based on analysis of metadata associated with the received content and/or by performing audio and/or image recognition on the received content to identify the one or more communication connection recipient identifiers. One or more communication devices (such as telephones) associated with the content receiver are identified (such as by consulting one or more sets of user preferences regarding associated communication devices). The content receiver may then signal the one or more communication devices to initiate one or more communication connections (such as telephone calls) utilizing the one or more communication identifiers. In some implementations, the content receiver may signal the one or more communication devices after receiving one or more user responses to one or more notifications regarding the one or more communication connection recipient identifiers.

FIG. 1 is a block diagram illustrating a system 100 for enabling communication connections related to received content. The system 100 includes a content receiver 101, one or more content providers 102, one or more presentation devices 103, one or more telecommunications devices 104, and one or more communication recipient devices 105.

The content receiver may be any kind of content receiver such as a television receiver, a set top box, a digital video recorder, a digital video disc player, a radio, a digital music player, a personal computer, a mobile computer, a video game system, and/or any other electronic device capable of receiving content from the one or more content providers via one or more wired communication links, wireless communication links, and/or physical distribution systems. The content provider may be any kind of content provider such as a satellite and/or cable television and/or music provider, a video on demand provider, a pay per view programming provider, a digital video disc and/or compact disc retailer, and/or any other entity that is capable of providing content to the content receiver. The telecommunication device may be any telecommunication device such as a telephone, a cellular telephone, an Internet protocol telephone, a public switched telephone network telephone, a modem, and/or any other electronic device that is capable of making telephone calls. Similarly, the communication recipient device may be any telecommunication device that is capable of receiving telephone calls. The presentation device may be any presentation device such as a cathode ray tube display, a liquid crystal display, a television, a computer monitor, a speaker, and/or any other electronic device capable of presenting received content transmitted by the content receiver.

The content receiver 101 may include one or more processing units 106, one or more receiver components 107, one or more output components 108, one or more non-transitory storage media 109 (which may take the form of, but is not limited to, a magnetic storage medium; optical storage medium; magneto-optical storage medium; read only memory; random access memory; erasable programmable memory; flash memory; and so on), and one or more transmitter components 110. The content receiver may also include one or more user interface components 111 which may be operable to receive input from and/or provide output to one or more user input output devices (not shown) such as one or more remote control devices, voice recognition devices, keyboards, virtual keyboards, touch screens, mice, track pads, track balls, motion sensing devices, and other such input and/or output devices. The processing unit may execute instructions stored in the non-transitory storage medium to receive content from the content provider 102 via the receiver component 102, store such received content in the non-transitory storage medium, and/or transmit received and/or stored content to the presentation device 103 via the output component 108.

The processing unit 106 may also execute instructions stored in the non-transitory storage medium 109 to determine that one or more telephone numbers are associated with one or more instances of content received by the content receiver 101. The processing unit may identify one or more telecommunications devices 104 that are associated with the content receiver 101 and may signal the telecommunications device utilizing the transmitter 110 to initiate one or more telephone connections to one or more communication recipient devices 105 utilizing the one or more telephone numbers. The transmitter may signal the telecommunications device utilizing any kind of communication connection such as a WiFi connection, a Bluetooth® connection, an Ethernet connection, a local area network connection, an internet connection, a HomePlug™ connection, a cellular connection, a telephone connection, a serial port connection, and/or any other kind of wired and/or wireless communication connection.

The telecommunications device 104 may include one or more processing units 112, one or more input components 113, one or more output components 114, and one or more non-transitory storage media 115. The processing unit 104 may execute instructions stored in the non-transitory storage medium 115 to receive one or more signals from the content receiver 101 via the input component 113. In response to a signal from the content receiver, the processing unit 104 may initiate one or more telephone connections to the one or more communication recipient devices 105 via the output component 114 utilizing one or more telephone numbers provided by the content receiver.

In various implementations, after determining that a telephone number is associated with an instance of content, the processing unit 106 may identify and/or signal the telecommunication device 104 after providing one or more notifications to one or more users and receiving an indication in response to initiate the telephone connection. For example, the processing unit 106 may present an indicator on the presentation device 103 (such as an icon, a sound alert, and/or other such indicator) and receive a user's selection based on the indicator via the user interface component 111, such as from a remote control device (not shown).

In some implementations, the processing unit 106 may determine that a telephone number is associated with an instance of content by detecting the presence of the telephone number in metadata that corresponds to and/or accompanies the instance of content. In one or more other implementations, the processing unit 106 may make such a determination by performing audio recognition and/or image recognition (utilizing one or more audio and/or image recognition processes and/or software applications) upon the instance of content to detect the telephone number in the instance content. Further, in various implementations the processing unit 106 may make such determinations when the content is received while in various other implementations the processing unit 106 may make such determinations while the content is stored in the non-transitory storage medium 109.

In various implementations, the processing 106 unit may identify the telecommunications devices 104 that are associated with the content receiver 101 by retrieving associated telecommunication device information that is stored in the non-transitory storage medium 109. In such implementations the processing unit 106 may be operable (such as in response to one or more user selections via the user interface component 111) to prompt one or more users (such as via the presentation device 103) to enter such associated telecommunication device information (such as one or more telephone numbers for one or more associated telecommunications devices 104), receive the associated telecommunication device information from the user (such as via the user interface component 111) in response to the prompt, and store the received associated telecommunication device information in the non-transitory storage medium 109.

Although the system 100 illustrates and describes a content receiver 101 determining that one or more telephone numbers are associated with one or more instances of content and signaling telecommunication devices 104 to initiate telephone connections based thereon, it is understood that initiation of other communication connections related to other associated communication connection recipient identifiers may be performed without departing from the scope of the present disclosure. By way of a first example, associated email addresses may be determined and associated electronic devices capable of sending email may be signaled to initiate an email connection. By way of a second example, associated web page and/or other Internet addresses may be determined and associated electronic devices capable of accessing web pages and/other Internet resources may be signaled to initiate a web and/or other kind of Internet connection. References to telecommunication devices and telephone numbers are for the purposes of illustration.

Further, although the presentation device 103 and the telecommunication device 104 are illustrated as distinct from the content receiver 101, in various implementations the presentation device and/or the telecommunications device may be integrated components of the content receiver.

Figure 2:
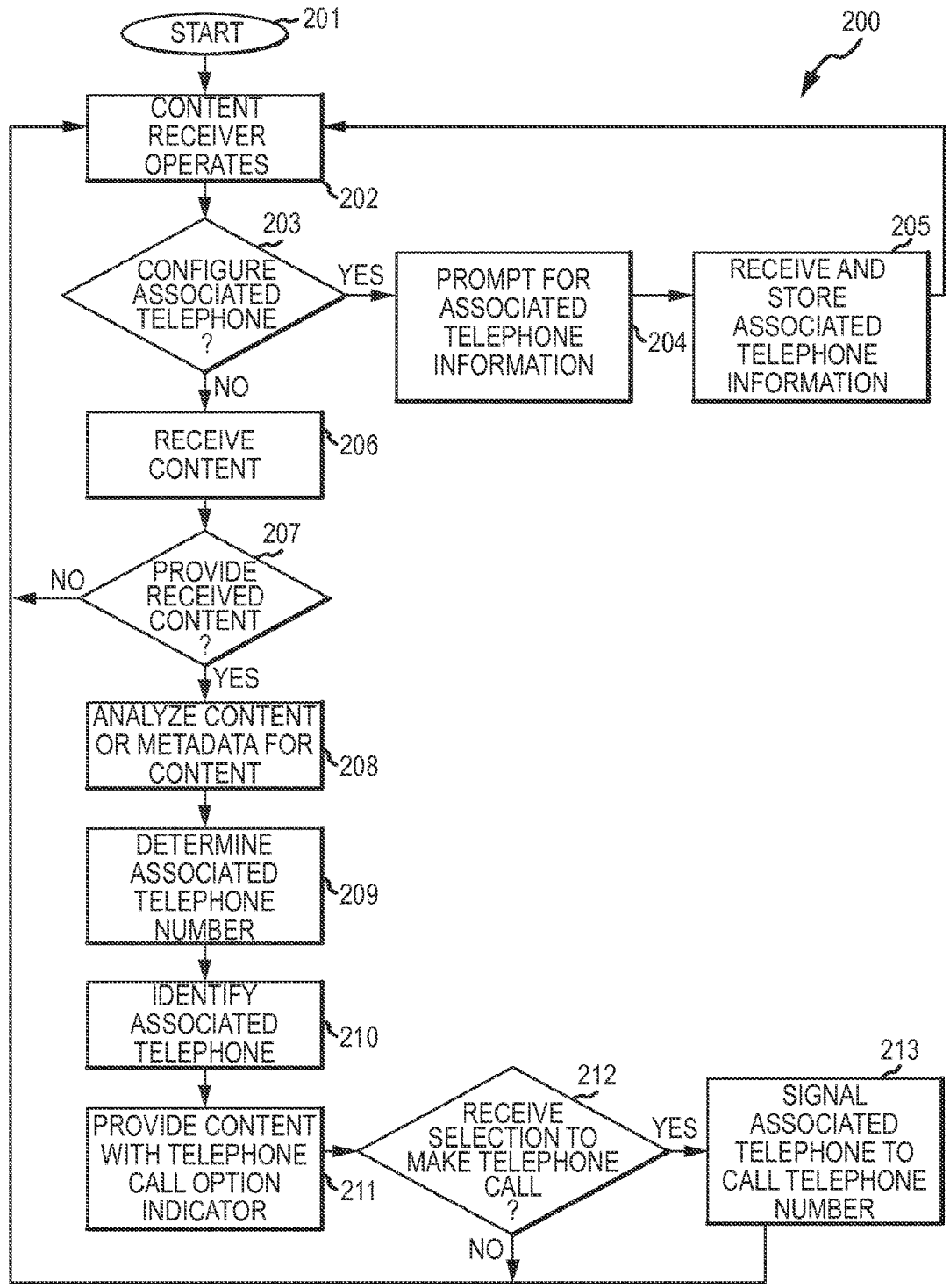
FIG. 2 is a flow chart illustrating a method for enabling communication connections related to received content. In various implementations, this method may be performed by the system of FIG. 1.

FIG. 2 illustrates a method 200 for enabling communication connections related to received content. In various implementations, the method 200 may be performed by the content receiver 101 of FIG. 1. The flow begins at block 201 and proceeds to block 202 where the content receiver 101 operates. The flow then proceeds to block 203 where the content receiver determines whether or not to configure associated telephones. The content receiver may determine to configure associated telephones based on user input. If so, the flow proceeds to block 204. Otherwise, the flow proceeds to block 206.

At block 204, after the content receiver 101 determines to configure associated telephones, the content receiver prompts one or more users for associated telephone information. The flow then proceeds to block 205 where the content receiver receives the associated telephone information from the one or more users and stores such information. Next, the flow returns to block 202 where the content receiver continues to operate.

At block 206, after the content receiver 101 determines not to configure associated telephones, the content receiver receives content from the content provider 102. The flow then proceeds to block 207 where the content receiver determines whether or not to provide received content. If not, the flow returns to block 202 where the content receiver continues to operate. Otherwise, the flow proceeds to block 208.

At block 208, the content receiver 101 analyzes metadata accompanying the content and/or corresponding to the content and/or performs audio and/or image recognition on the content. The flow then proceeds to block 209 where the content receiver determines (based on the analysis and/or audio and/or image recognition in block 208) a telephone number associated with the content. Next, the flow proceeds to block 210 where the content receiver identifies a telephone associated with the content receiver by retrieving stored associated telephone information before the flow proceeds to block 210.

At block 210, the content receiver 101 provides the contents with a telephone option indicator to the presentation device 103. The flow then proceeds to block 211 where the content receiver determines whether or not a user selection of the telephone option indicator indicating to make a telephone call is received. If not, the flow returns to block 202 where the content receiver continues to operate. Otherwise, the flow proceeds to block 213 where the content receiver signals the identified associated telephone to initiate a telephone call using the determined telephone number associated with the content. The flow then returns to block 202 where the content receiver continues to operate.

It should be understood that the particular operations and order of operations illustrated and described with respect to method 200 are for the purposes of example. For example, in various implementations the content receiver may configure associated telephone numbers at any time during operation instead of prior to receiving content as illustrated in method 200. Further, in various implementations the content receiver may analyze received content at times other than after determining to provide the content, such as upon receipt of the content, during storage of the content, and/or other such times.

FIGS. 3A-3E illustrate a user 301A-301E utilizing a system 300A-300E for enabling communication connections related to received content in order to make a telephone call related to a television program the user is watching. In one or more implementations, the system 300A-300E may be the system 100 of FIG. 1.

In FIG. 3A, a user 301A is watching television programming received by a set top box 302A and displayed on a television screen 304A of a television 303A. As illustrated, the television programming is an infomercial and includes a telephone number for purchasing products showcased by the infomercial. Also as illustrated, the user has a remote control 305A that the user can utilize to control the set top box and a cell phone 306A which the user has previously associated with the set top box.

The set top box 302A may analyze metadata included with the television programming that indicates the presence of the telephone number and specifies the telephone number that is present. As illustrated in FIG. 3B, the set top box 302B may then display the infomercial on the television screen 304B with a phone icon 308B which indicates that the set top box has detected a telephone number that the set top box can signal the user's 301B cell phone 306B to call.

Figure 3C:
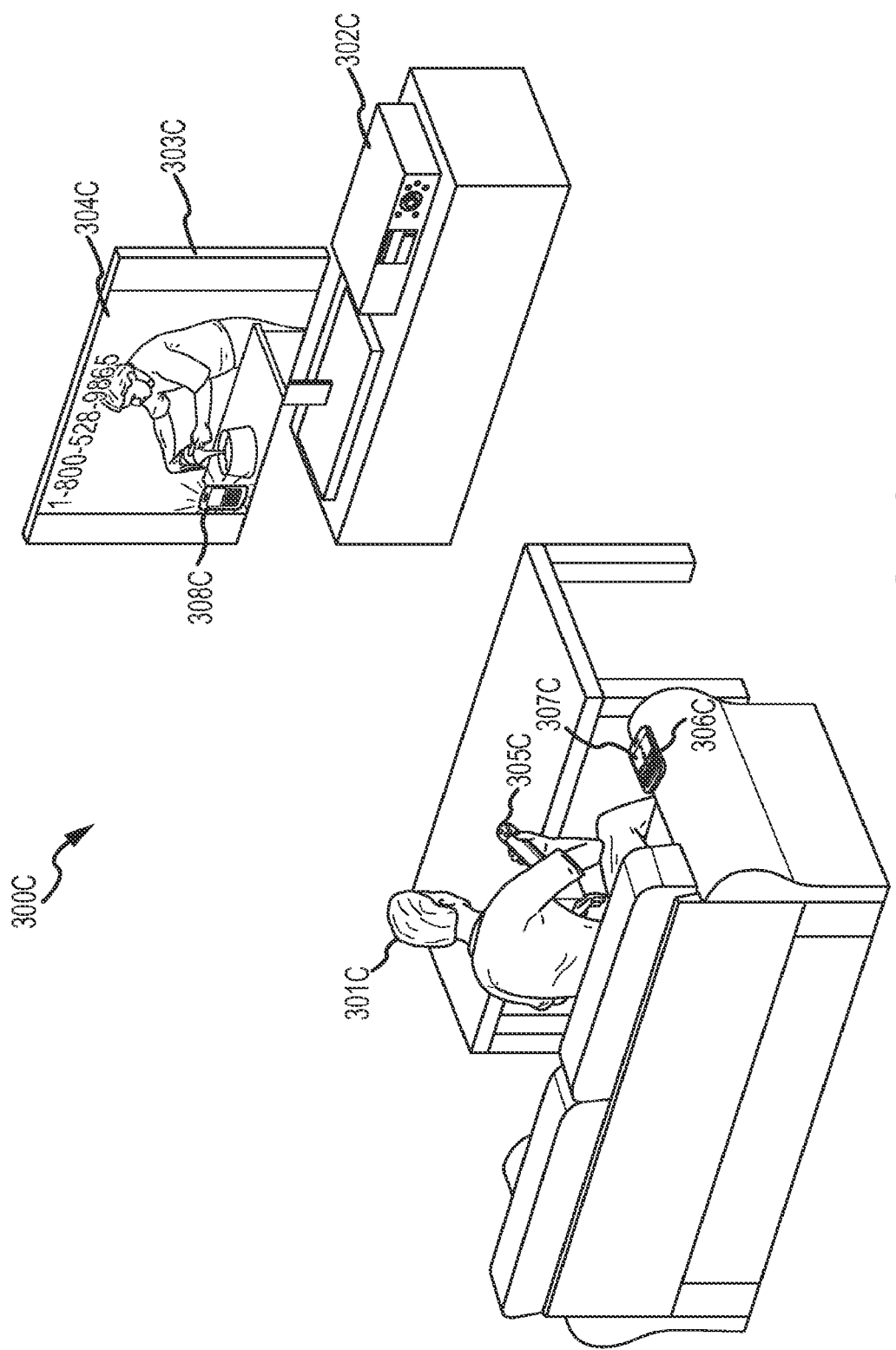
Figure 3D:
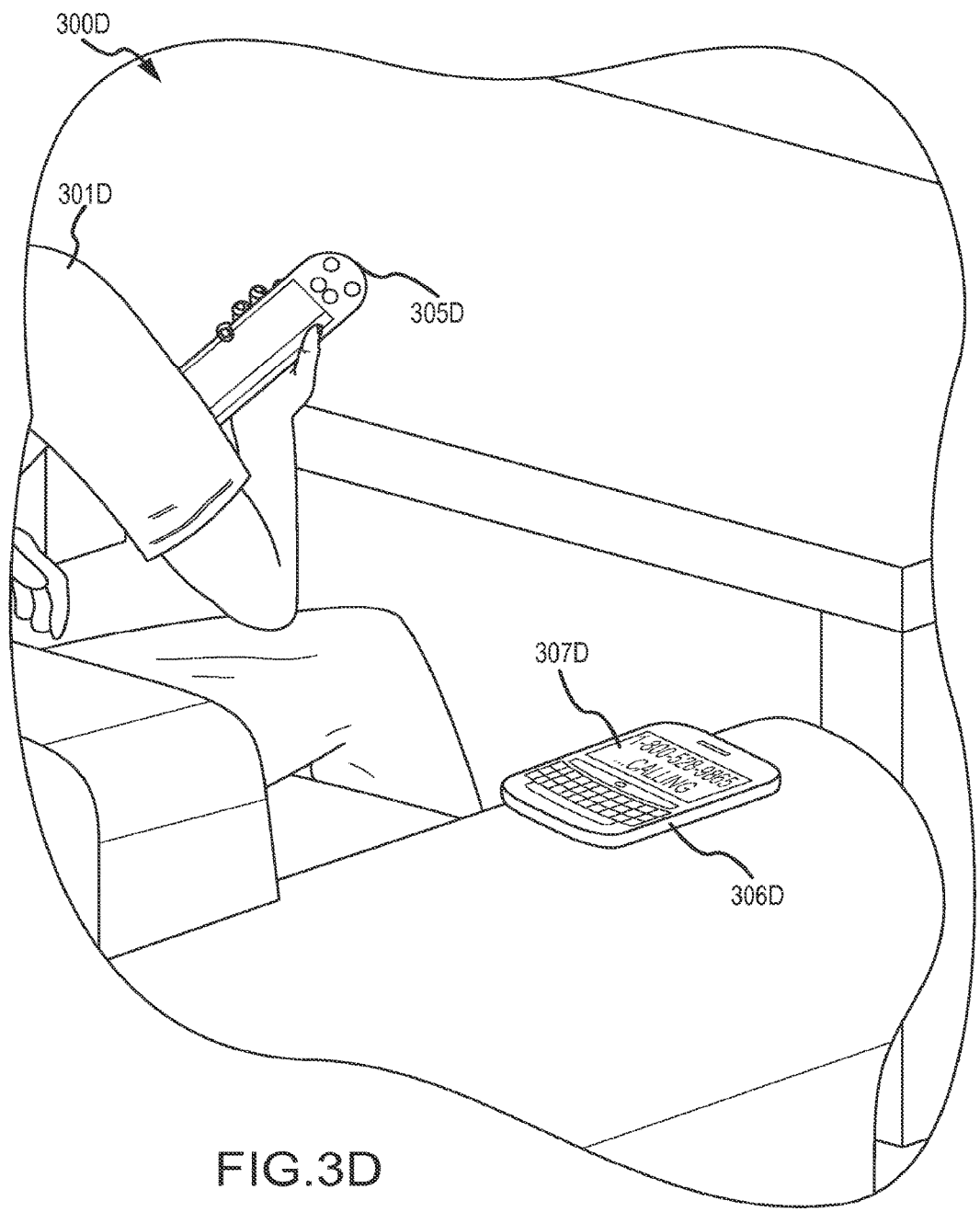
Figure 3E:
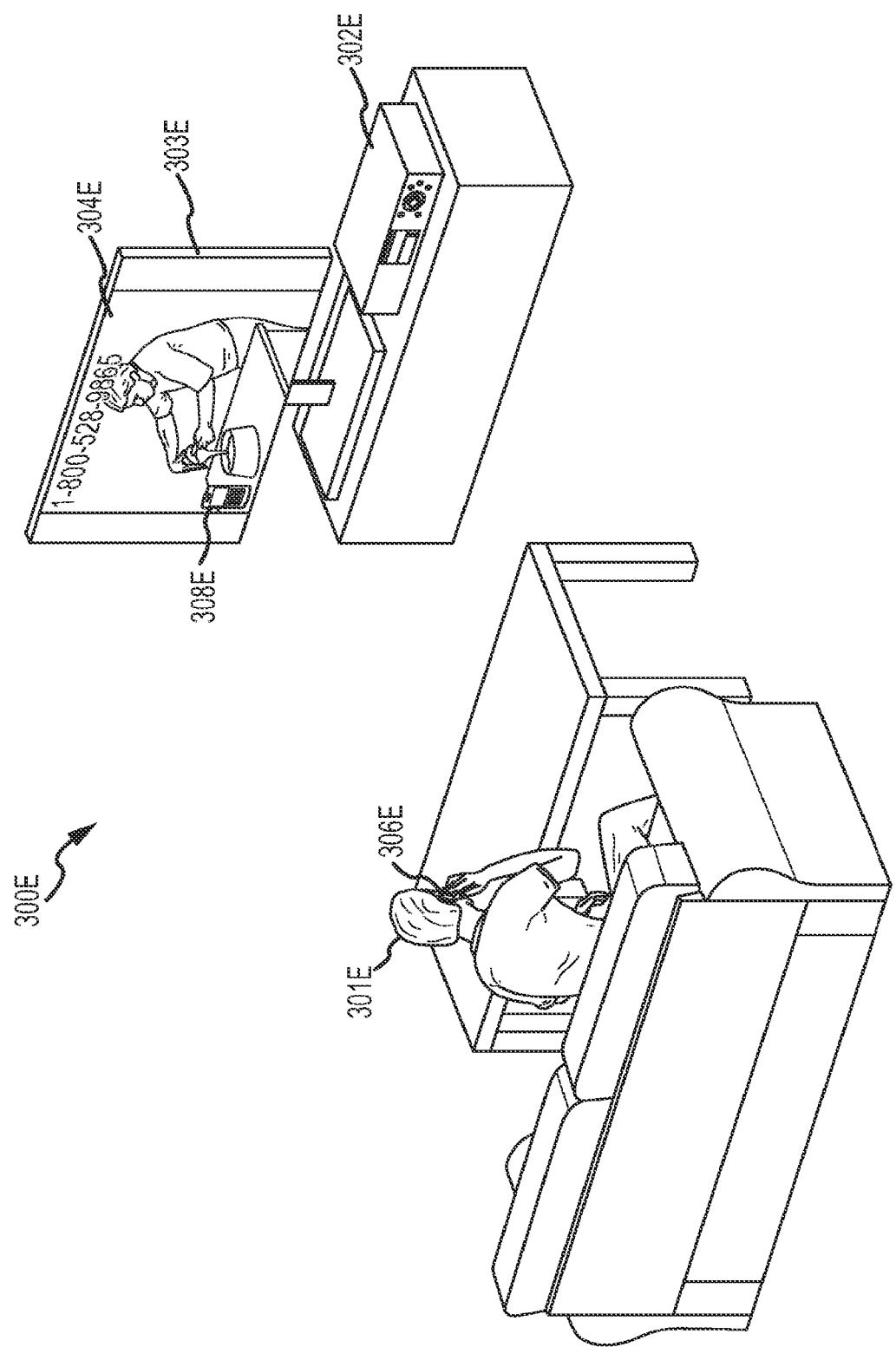

As illustrated in FIG. 3C, the user 301C may utilize the remote control 305C to select the phone icon 308C. In response to receiving the selection of the phone icon 308C, as illustrated in FIG. 3D, the set top box 302D may signal the cell phone 306D to initiate a telephone call to the telephone number. Also as illustrated, the cell phone 306D may initiate the telephone call to the telephone number in response to receiving the signal from the set top box 302D and may display a notification of such on a screen 307D of the cell phone. As illustrated in FIG. 3E, after the cell phone 306E has initiated the telephone call to the telephone number, the user 301E may access the cell phone in order to perform one or more operations associated with the connected telephone call.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for enabling communication connections related to received content at a content receiver, the method comprising:
   determining, utilizing at least one processing unit, that at least one telephone number is associated with at least one instance of content stored in a digital video recorder by analyzing metadata related to the at least one instance of content, wherein the at least one telephone number is provided within the metadata and is extracted from the metadata by the content receiver, and wherein the metadata is provided to the content receiver separately from the at least one instance of content;
   identifying at least one external telecommunication device, utilizing the at least one processing unit, that is separate from the content receiver but that is in communication with the content receiver, wherein the at least one external telecommunication device comprises a cellular telephone that is physically separate and apart from the content receiver;
   providing at least one notification to at least one user regarding the at least one telephone number, wherein the at least one notification is displayed as an icon that does not include the at least one telephone number;
   receiving at least one response to the at least one notification from the at least one user indicating to call the at least one telephone number, wherein the at least one response comprises a signal indicating a request for the at least one telephone number and is received from a user interface component that is separate from the at least one external telecommunication device; and
   providing, utilizing the at least one processing unit and in response to the signal indicating the request for the at least one telephone number, the at least one telephone number extracted from the metadata to the external telecommunication device during playback of the at least one instance of content from the digital video recorder to initiate at least one telephone connection utilizing the at least one telephone number, wherein the signal indicating the request for the at least one telephone number is received after a user-initiated request for playback of the content and during playback of the at least one instance of content, and wherein the at least one telephone number is provided wirelessly to the cellular telephone in the form of a wireless signal using a wireless transmitter integrated with the content receiver, wherein the wireless signal is directed specifically to the cellular telephone.

2. The method of claim 1, wherein said metadata related to the at least one instance of content is provided within electronic program guide data delivered to the content receiver in a separate band from the at least one instance of content.

3. The method of claim 1, wherein said operation of identifying at least one telecommunication device, utilizing the at least one processing unit, that is associated with the content receiver further comprises retrieving associated telecommunication device information from at least one non-transitory storage medium.

4. The method of claim 3, further comprising:
   prompting at least one user for the associated telecommunication device information; and
   storing the associated telecommunication device information received from the at least one user in the at least one non-transitory storage medium.

5. A content receiver system for receiving received content, the content receiver system comprising:
   at least one receiver component that receives at least one instance of the received content;
   a digital video recorder that stores the received content;
   at least one wireless transmitter component;
   at least one processing unit that: (a) extracts at least one telephone number associated with the at least one instance of the received content stored in the digital video recorder from metadata about the received content that is received at the content receiver system separately from the received content, (b) identifies that at least one external telecommunication device is in communication with the content receiver system, wherein the at least one external telecommunications device comprises a cellular telephone that is physically separate and apart from the content receiver, and (c) provides, in response to a signal indicating a request for the at least one telephone number and received from a user interface component that is separate from the at least one external telecommunication device and wherein the signal indicating the request for the at least one telephone number is received after a user-initiated request for playback of the received content and during playback of the received content, the extracted at least one telephone number to the at least one external telecommunication device via the at least one wireless transmitter component during playback of the received content from the digital video recorder to initiate at least one telephone connection utilizing the at least one telephone number extracted from the metadata provided separately from the received content; and
   at least one user interface component that provides at least one notification to at least one user regarding the at least one telephone number, wherein the at least one notification is displayed as an icon that does not include the at least one telephone number, wherein the at least one user interface component receives at least one response to the at least one notification from the at least one user indicating to call the at least one telephone number prior to the at least one processing unit signaling the at least one external telecommunication device, and wherein the at least one response comprises the signal indicating a request for the at least one telephone number, and
   wherein the at least one telephone number is provided wirelessly to the cellular telephone in the form of a wireless signal using the at least one wireless transmitter component, wherein the wireless signal is directed specifically to the identified cellular telephone.

6. The system of claim 5, wherein the metadata related to the at least one instance of content is provided within electronic program guide data delivered to the content receiver system in a separate band from the received content.

7. The system of claim 5, wherein the at least one processing unit identifies that the at least one external telecommunication device is associated with the content receiver system by retrieving associated telecommunication device information from at least one non-transitory storage medium of the at least one content receiver.

8. The system of claim 7, wherein the content receiver system further comprises at least one user interface component that prompts at least one user for the associated telecommunication device information and the at least one processing unit stores the associated telecommunication device information received via the at least one user interface component in the at least one non-transitory storage medium.

9. A computer program product that is stored in at least one non-transitory machine readable medium, comprising:
   a first set of instructions, stored in the at least one non-transitory machine readable medium, executable by at least one processing unit to determine that at least one telephone number is provided in metadata associated with a television program received by a content receiver and stored in a digital video recorder, wherein the metadata is received by the content receiver separately from the television program;
   a second set of instructions, stored in the at least one non-transitory machine readable medium, executable by the at least one processing unit to identify an external telephone that is in communication with the content receiver, wherein the at least one external telephone comprises a cellular telephone that is physically separate and apart from the content receiver;
   a third set of instructions, stored in the at least one non-transitory machine readable medium, executable by the at least one processing unit to provide at least one notification to at least one user regarding the at least one telephone number, wherein the at least one notification is displayed as an icon that does not include the at least one telephone number;
   a fourth set of instructions, stored in the at least one non-transitory machine readable medium, executable by the at least one processing unit to receive at least one response to the at least one notification from the at least one user indicating to call the at least one telephone number, wherein the at least one response comprises a signal indicating a request for the at least one telephone number and is received from a user interface component that is separate from the at least one external telecommunication device; and
   a fifth set of instructions, stored in the at least one non-transitory machine readable medium, executable by the at least one processing unit when the stored television program is being played back from the digital video recorder to provide, in response to the signal indicating the request for the at least one telephone number, wherein the signal indicating the request for the at least one telephone number is received after a user-initiated request for playback of the television program and during playback of the television program, the at least one telephone number to the external telephone to thereby allow the external telephone to initiate a telephone call to the at least one telephone number that is provided in the metadata associated with the television program that is provided separately from the television program, wherein the at least one telephone number is provided wirelessly to the cellular telephone in the form of a wireless signal using a wireless transmitter integrated with the content receiver, wherein the wireless signal is directed specifically to the cellular telephone.

10. The computer program product of claim 9, wherein the at least one telephone number is provided to the external telephone while the at least one telephone number is being displayed by the content receiver during playback of the stored television program from the digital video recorder.

11. The computer program product of claim 9 wherein the metadata related to the television program is provided within electronic program guide data delivered to the content receiver in a separate band from the at least one instance of content.

* * * * *